United States Patent [19]

Araki et al.

[11] Patent Number: 5,543,813

[45] Date of Patent: Aug. 6, 1996

[54] SYSTEM FOR DETERMINING AND REGISTERING LOCATION OF MOBILE TERMINAL FOR COMMUNICATION SYSTEM WITH NON-GEOSYNCHRONOUS SATELLITES

[75] Inventors: Noriyuki Araki, Ohmiya; Hideyuki Shinonaga, Hanno; Yasuhiko Itoh, Tokyo, all of Japan

[73] Assignee: Kokusai Denshin Denwa Kabushiki Kaisha, Tokyo, Japan

[21] Appl. No.: 282,309

[22] Filed: Jul. 29, 1994

[30] Foreign Application Priority Data

Aug. 12, 1993 [JP] Japan ................................ 5-219284
Aug. 12, 1993 [JP] Japan ................................ 5-219285

[51] Int. Cl.$^6$ ............................................. G01S 5/02
[52] U.S. Cl. ...................... 342/357; 342/352; 455/12.1
[58] Field of Search ........................... 342/352, 357; 455/12.1; 364/459

[56] References Cited

U.S. PATENT DOCUMENTS 4,652,884  3/1987  Starker ................................ 342/357
5,396,643  3/1995  Frenzer et al. ..................... 455/13.1

*Primary Examiner*—Thomas H. Tarcza
*Assistant Examiner*—Dao L. Phan
*Attorney, Agent, or Firm*—Emmanuel J. Lobato

[57] ABSTRACT

The non-geosynchronous orbiting satellites each transmit identification information given to each of spot beams irradiated from them. A mobile terminal, when registering its location, receives the spot beam identification information at some moments in time with the predetermined time interval. Then, the mobile terminal transmits the received spot beam identification information and each of their reception time together with the terminal identification information assigned to the mobile terminal. On the basis of an overlapped area of spot beam coverage areas at time when each of identification information is received by the terminal, a terrestrial network estimates and registers the latest location of the mobile terminal.

2 Claims, 6 Drawing Sheets

SYSTEM FOR DETERMINING AND REGISTERING LOCATION OF MOBILE TERMINAL FOR COMMUNICATION SYSTEM WITH NON-GEOSYNCHRONOUS SATELLITES

BACKGROUND OF THE INVENTION

The present invention relates to communication systems using non-geosynchronous satellites and, more particularly, to a system which determines and registers the locations of mobile terminals.

There has been proposed, as one of next-generation mobile satellite communication systems, some mobile or personal communication systems using multi-spot beam satellites in non-geosynchronous orbits. In these communication systems, a plurality of satellites are put into orbits at an altitude lower than those for geosynchronous orbiting satellites of conventional satellite communications systems, that is, into a low earth orbit (in the altitude range of 500 to 2,000 kilometers) or medium earth orbit (in the altitude range of 10,000 to 35,000 km) and to link the satellites with mobile terminals through spot beams.

Communications systems using non-geosynchronous orbiting satellites, as described above, have advantages such as low propagation loss, short propagation delay, a simple satellite configuration, and a smaller number of spot beams required for each satellite than that for a multi-spot beam satellite in the geosynchronous orbit.

FIG. 8 is a conceptual diagram of the communication between a mobile terminal and a land earth station in the mobile satellite communication system. In FIG. 8, reference number 1 denotes a mobile terminal, 2 a land earth station, 30 a multi-spot beam satellite capable of communicating with the mobile terminal 1 and the land earth station 2, and 30-1 through 30-7 individual spot beam coverage areas formed or defined by dividing an satellite coverage area.

Upon occurrence of an incoming call to a mobile terminal in such mobile satellite communication systems, it is necessary to transmit paging message to connect a call to the called terminal. To minimize the number of channels required for paging, it is desirable that areas for transmitting paging message be set as small as possible.

The Inmarsat standard-A system adopts a method that a caller designates the ocean region, by dialing, where the called mobile terminal is expected to be located at the time of originating a call. When areas for paging are wide, the number of areas to be selected by the caller is small but the large number of channels for transmitting paging messages is required, whereas when the areas for paging are narrow, the number of channels required for paging is small but the burden on the caller increases. Hence, it is particularly impractical to apply this method to communication systems in which the number of subscribers is large. It is therefore desirable to implement a method or scheme wherein, as in the terrestrial cellular systems, the communication system accurately keeps tracks of locations of all pageable mobile terminals. For example, by managing the information in databases of a terrestrial network or the like and allows the caller to call a desired mobile terminal just by dialing a number assigned to the terminal equipment or its user. For a system using multi-spot beam satellites in the geosynchronous orbit, it is possible to determine and register the locations of mobile terminals in the same manner as in the terrestrial cellular systems. Namely, a coverage area of each spot beam irradiated from satellites can be utilized as the location information of mobile terminals.

In the system using non-geosynchronous orbiting satellites, however, since the satellite 30 rotates around the earth, the satellite coverage areas 30-1 through 30-7, over which mobile terminals can communicate with the satellite 30, and the spot beam coverage areas move on the surface of the earth, accordingly. Hence if spot beam coverage areas are used as the location information of mobile terminals, the location information will be updated very frequently, and so, many channels will be required to register and update the location information, which is not practical.

SUMMARY OF THE INVENTION

An object of the present invention is to provide a system for determining and registering the locations of mobile terminals for communication systems using non-geosynchronous orbiting satellites.

To attain the above object, a system for determining and registering the locations of mobile terminals, according to the present invention, is performed for communication systems using non-geosynchronous orbiting satellites having a configuration wherein;

a plurality of non-geosynchronous orbiting satellites each transmits identification information of each spot beam irradiated therefrom;

when registering its location, a mobile terminal receives pieces of spot beam identification information from satellites at some moments in time with the predetermined time interval and transmits, via the satellites, the received pieces of spot beam identification information and each of their reception time, as the location information of the mobile terminal;

an overlapped area of a plurality of spot beam coverage areas, corresponding to the received pieces of identification information, at each reception time is used for registering the location information of the mobile terminal.

According to the present invention, the latest location information of mobile terminals is registered in data storage units built in the terrestrial network as referred to above.

Hence, a call can be connected to the called mobile terminal simply by sending the paging message over the registered areas, using appropriate land earth stations, satellites, and spot beams. This permits reduction of the number of channels for transmitting paging message.

BRIEF DESCRIPTION OF THE DRAWINGS

The present invention will be described in detail below with reference to accompanying drawings, in which.

PREFERRED EMBODIMENTS OF THE INVENTION

[Embodiment 1]

An embodiment of the present invention will be described with reference to the accompanying drawings.

In this embodiment, non-geosynchronous orbiting satellites equipped with multi-spot beam irradiating mechanism are employed and a plurality of satellites are arranged so that a mobile terminal and a land earth station can be accessible from them. Furthermore, each of spot beams of satellites is uniquely assigned to its identification codes, which enable mobile terminals to identify the satellite and spot beam. The satellites transmit the spot beam identification codes through the spot beam at all time. When a mobile terminal registers its location, it receives the spot beam identification codes at some moments in time with the predetermined time interval. For example, a mobile terminal receives the identification information three times, namely, at the time T, at the time T+$\Delta$t, and at the time T+2* $\Delta$t, where $\Delta$t is the predetermined time interval. Then, the terminal transmits the received spot beam identification codes, each reception time, and the terminal identification code, uniquely assigned, to a terrestrial network.

Figure 1:
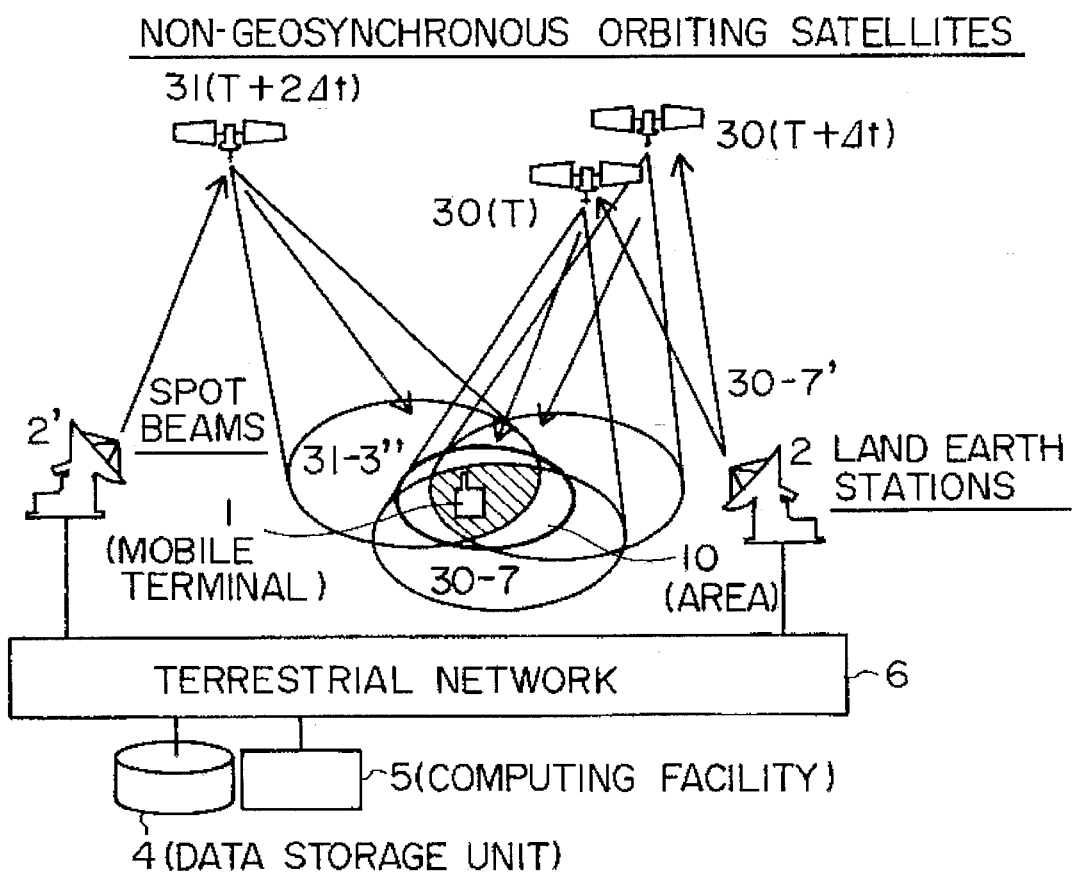
FIG. 1 is a conceptual diagram showing the location determination and registration according to the present invention.

FIG. 1 conceptually shows the positional relationships of a mobile terminal, satellites and land earth stations at a certain moment in time. In FIG. 1, reference numeral 1 denotes a mobile terminal, 30 and 31 non-geosynchronous orbiting satellites employed in the communication system, 30-7 and 30-7' areas irradiated by the same spot beam of the satellite 30 at the moments T and T+$\Delta$t, respectively, 31-3" an area irradiated by a spot beam of the satellite 31 at the moment T+2* $\Delta$t, 4 a data storage unit, which manages the location information of a mobile terminal 1, 5 a computing facility for providing orbital information of all satellites, 6 a terrestrial network of the mobile communication system using non-geosynchronous orbiting satellites, and 10 the location area of the mobile terminal 1 estimated by the terrestrial network. Orbit information of an artificial satellite can be obtained through such methods as in the reference, "Methods of Orbit Determination", John Wiley & Sons Inc., 1965. Through the orbital information of the satellites, the coverage area of spot beam received at the mobile terminal 1 is thus calculated by providing the computing facility with spot beam identification code with its reception time.

When the mobile terminal 1 requests the location registration at time T, it receives the spot beam identification codes transmitted thereto at the moments T, T+$\Delta$t, and T+2* $\Delta$t. That is, the mobile terminal receives a spot beam identification code, BID 307, at time T, a spot beam identification code, BID 307, at time T+$\Delta$t again, and a spot beam identification code, BID 313, at time T+2* $\Delta$t. The mobile terminal 1 transmits via satellites 30 and 31 the received spot beam identification codes and each of their reception time together with the terminal identification code TID1, which is uniquely allocated to the mobile terminal 1. This set of information is received by the land earth station 2, for instance. The land earth station 2 transfers the received information to the computing facility 5.

Figure 2:
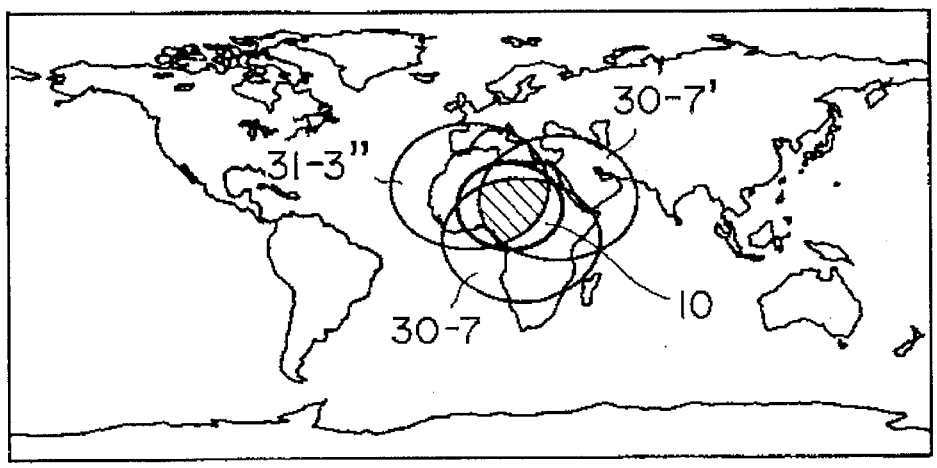
FIG. 2 is a conceptual diagram showing how location information of mobile terminal is estimated on the basis of spot beam identification information in the system employing the present invention.

FIG. 2 shows how the location of the mobile terminal 1 is estimated by the computing facility 5 on the basis of such information as mentioned above. The computing facility 5 uses the orbit information of all satellites to compute the coverage area 30-7 irradiated by the spot beam with the identification code BID 307 at time T, the area 30-7' irradiated by the spot beam with the identification code BID 307 at time T+$\Delta$t, and the area 31-3" irradiated by the spot beam with the identification code BID 313 at time T+2* $\Delta$t. Then, the computing facility 5 calculates an overlapped area, as indicated by hatching, of the spot beam coverage areas 30-7, 30-7' and 31-3" and estimates the area 10, which is a little wider than the overlapped area, taking into account movement of the mobile terminal and the offset of the actual satellite position from the calculated one. The area 10 thus estimated is transferred, as the location information of the mobile terminal 1 at time T, to the data storage unit 4 together with the terminal identification code TID1 of the mobile terminal 1.

Figure 3:
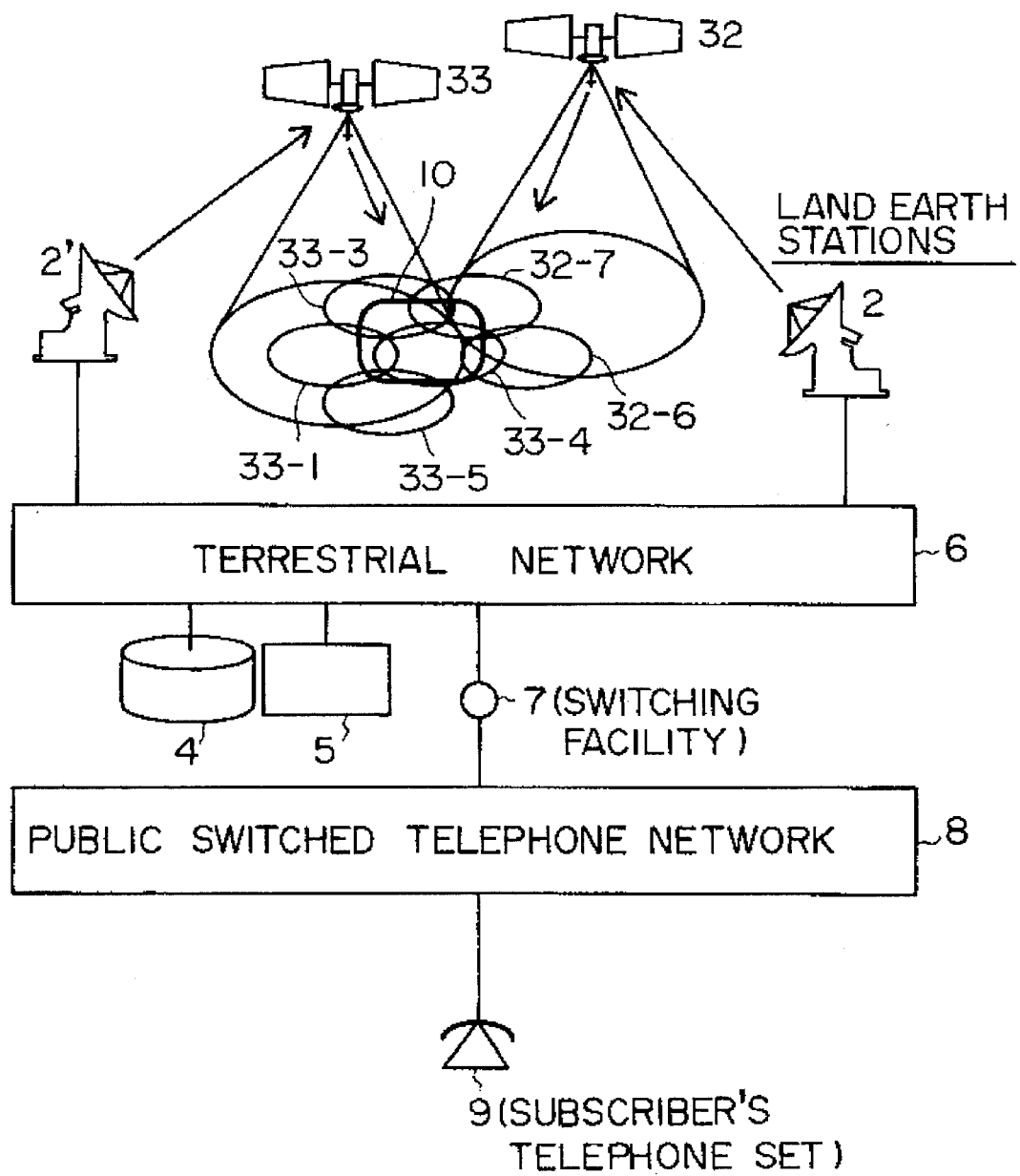
FIG. 3 is a conceptual diagram showing how the paging message is transmitted to the called mobile terminal equipment on the basis of its latest location information in the system employing the present invention.

FIG. 3 conceptually shows the paging message transmission for the mobile terminal 1. In FIG. 3, reference numerals 32 and 33 denote satellites employed in the communication system, and 32-6, 32-7, and 33-1, 33-3, 33-4, 33-5 spot beam coverage areas of the satellites 32 and 33 respectively. Reference numeral 7 denotes a switching facility, 8 a public switched telephone network, and 9 a subscriber's, telephone set. Upon occurrence of a call destined for the mobile terminal 1, the location information of the area 10 of the mobile terminal 1 is referred to. The location information of the area 10 is transferred to the computing facility 5, which selects the appropriate spot beams of satellites, now irradiating the area 10. Furthermore, the appropriate land earth station is selected which are suitable for transmitting paging message to the mobile terminal 1 through the selected spot beams. In the case of FIG. 3, the spot beams 32-6, 32-7, 33-1, 33-3, 33-4 and 33-6 and the land earth stations 2 and 2' are used to transmit the paging message to the area 10, which has been registered as the latest location of the mobile terminal 1.

[Embodiment 2]

Figure 4:
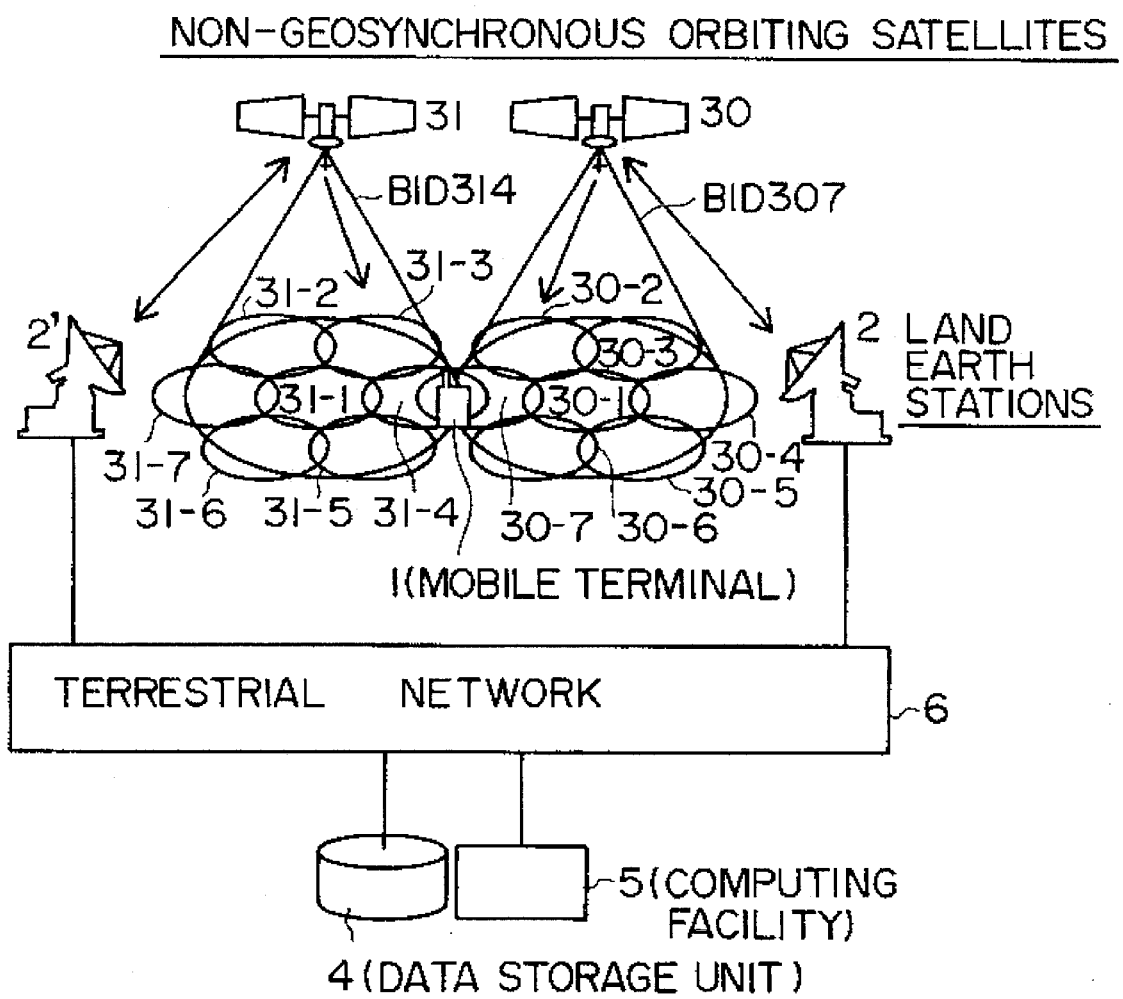
FIG. 4 is a conceptual diagram showing the location determination and registration according to the present invention.

FIG. 4 conceptually shows the positional relationships of a mobile terminal, satellites, spot beam coverage areas, and land earth stations at a certain moment in time. In FIG. 4, reference numeral 1 denotes a mobile terminal, 2 and 2' land earth stations employed in the communication system, 30 and 31 non-geosynchronous orbiting satellites employed in the communication system, 30-1 through 30-7 and 31-1 through 31-7 areas irradiated by spot beams of the satellites 30 and 31, respectively, at the moments T, 4 a data storage unit, which manages the location information of a mobile terminal 1, 5 a computing facility for providing orbital information of all satellites, and 6 a terrestrial network of the mobile communication system using non-geosynchronous orbiting satellites. The coverage area of spot beam received at mobile terminals can be calculated with orbit information of a satellite through such methods as in the reference, "Methods of Orbit Determination", John Wiley & Sons Inc., 1965. In a state as shown in FIG. 4, the mobile terminal 1 can communicate via two spot beams corresponding to the coverage areas 30-7 and 31-4. Namely, when the mobile terminal 1 registers its location in a state as shown in FIG. 4, it receives spot beam identification codes, BID 307 and BID 314. The mobile terminal 1 transmits the spot beam identification codes BID 307 and BID 314, the reception time T, and the terminal identification code TID 1, which is uniquely assigned to the terminal 1. These set of information are received by the land earth station 2, for instance. The land earth station 2 transfers these set of information to the computing facility 5.

Figure 5:
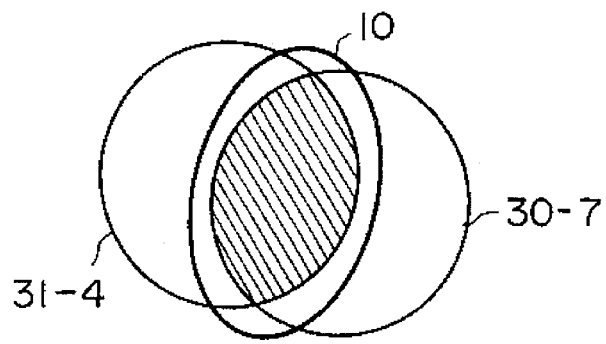
FIG. 5 is a conceptual diagram showing how location information of mobile terminal is estimated on the basis of spot beam identification information in the system employing the present invention.
Figure 6:
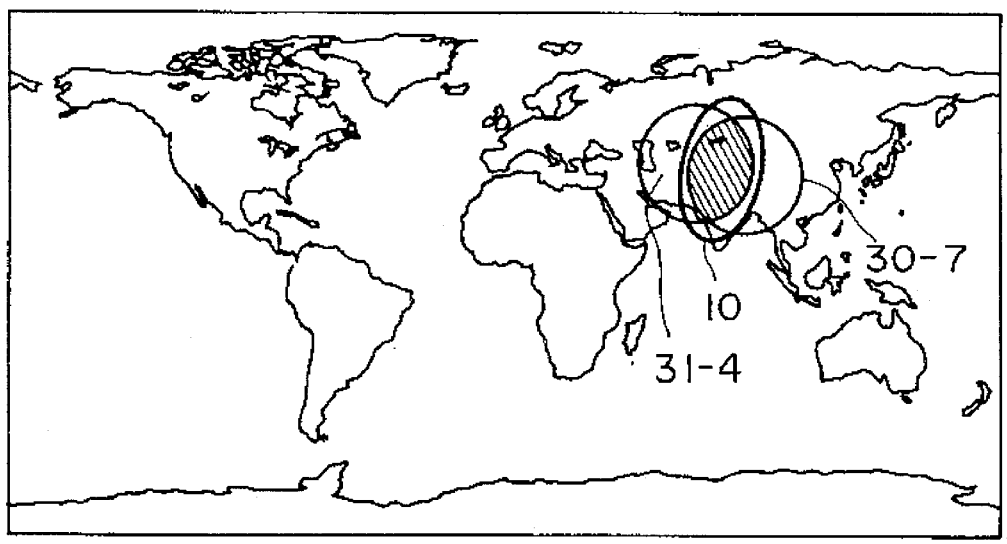
FIG. 6 is a conceptual diagram showing how location information of mobile terminal is estimated on the basis of spot beam identification information in the system employing the present invention.

FIG. 5 and 6 show how the location of the mobile terminal 1 is estimated on the basis of such information as mentioned above. In FIG. 5 and 6, reference numeral 10 denotes an area that is estimated as the location information of the mobile terminal 1. The computing facility 5 uses the orbit information of all satellites to calculate the coverage areas 30-7 and 31-4 irradiated by the spot beams corresponding to the identification codes BID 307 and BID 314, respectively, at time T. The computing facility 5 calculates an overlapped area (indicated by hatching) of the spot beam coverage areas 30-7 and 31-4, and estimates an area 10, which is little wider than the overlapped area, taking into account movement of the mobile terminal 1 and the offset of the actual satellite position from the calculated one. The area 10 thus estimated is transferred, as the location information of the mobile terminal 1 at time T, to the data storage unit 4 together with the terminal identification code TID 1 of the mobile terminal 1.

Figure 7:
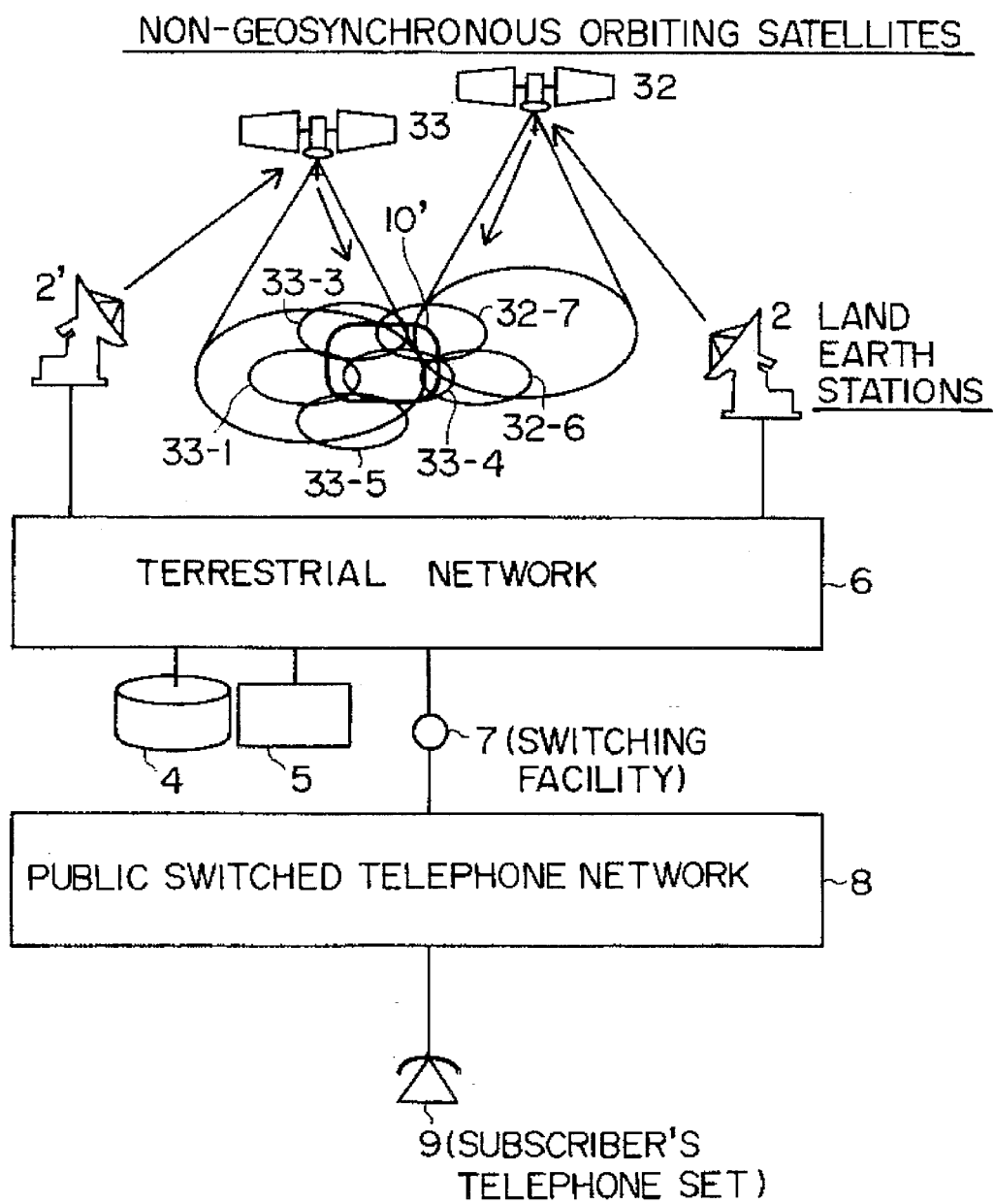
FIG. 7 is a conceptual diagram showing how the paging message is transmitted to the called mobile terminal on the basis of its latest location information in the system employing the present invention.
Figure 8:
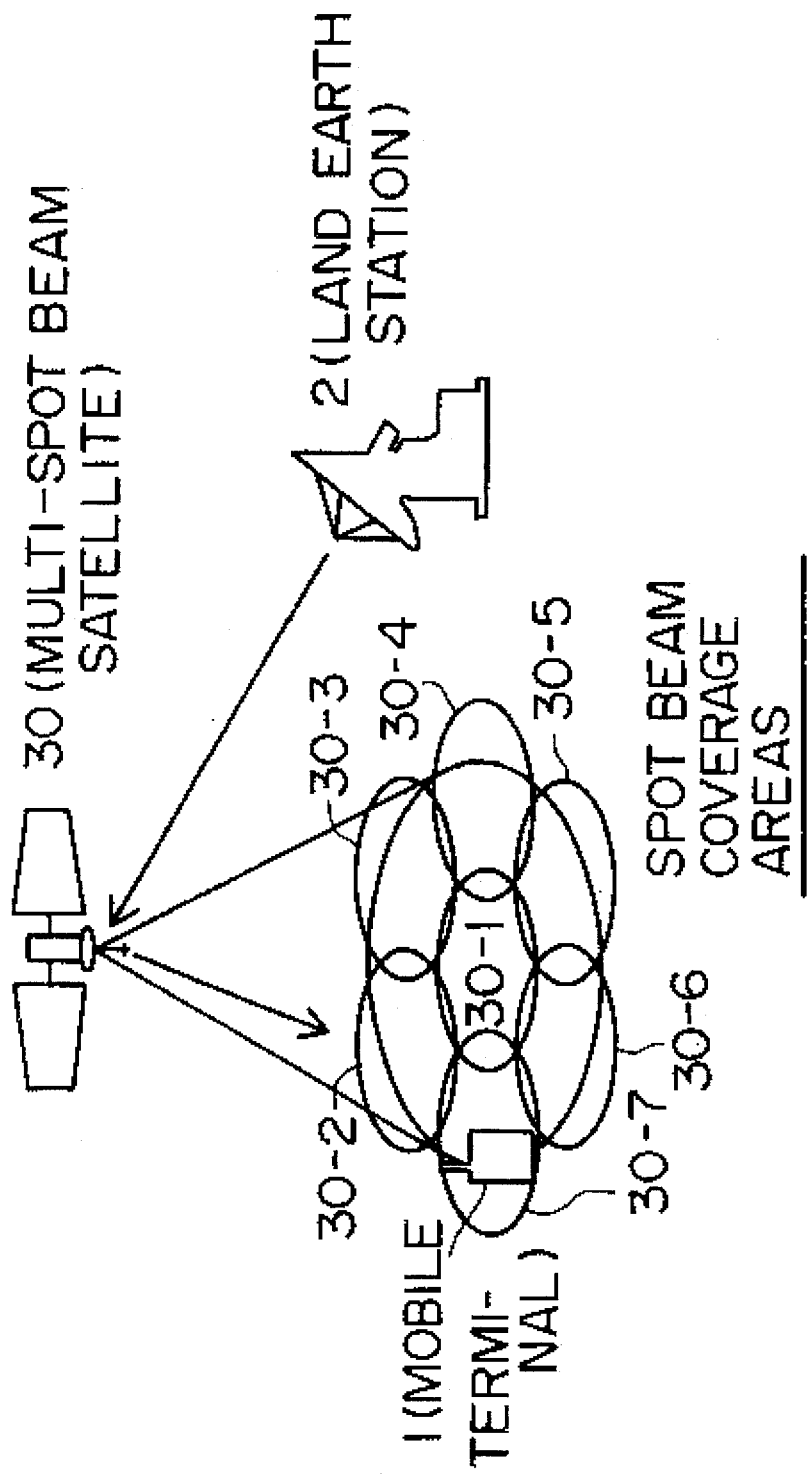
FIG. 8 is a conceptual diagram of mobile satellite communication system.

FIG. 7 conceptually shows the paging message transmission for the mobile terminal 1. In FIG. 7, reference numerals 32 and 33 denote non-geosynchronous orbiting satellites employed in the communication system, and 32-6, 32-7, and 33-1, 33-3, 33-4, 33-5 spot beam coverage areas of the satellites 32 and 33, respectively. Reference numeral 7 denotes a switching facility, 8 a public switched telephone network, and 9 a subscriber's telephone set. Upon occurrence of a call destined for the mobile terminal 1, the location information of the area 10 of the mobile terminal 1 is referred to. The location information of the area 10 is transferred to the computing facility 5, which selects the appropriate spot beams of satellites, now irradiating the area 10. Furthermore, the appropriate land earth station is selected which are suitable for transmitting paging message to the mobile terminal 1 through the selected spot beams. In the case of FIG. 7, the spot beams 32-6, 32-7, 33-1, 33-3, 33-4 and 33-6 and the land earth stations 2 and 2' are used to transmit the paging message to the area 10, which has been registered as the latest location of the mobile terminal 1.

According to the present invention, the latest location of each mobile terminal, estimated through the utilization of spot beam coverage areas, is registered in the terrestrial network; consequently, a call can be connected thereto by transmitting the paging message over a limited narrow area, using the appropriate land earth stations, satellites, and spot beams. Hence, the number of channels required for transmitting paging message can be reduced.

What we claim is:

1. A system for determining and registering the location of a mobile terminal for a communication system with non-geosynchronous satellites wherein:

a plurality of non-geosynchronous satellites are disposed and a plurality of land earth stations are disposed on the earth;

each of said satellites irradiates a spot beam to its satellite coverage area on the earth where mobile terminals can communicate with the satellite, or each of said satellites irradiates a spot beam to each of a plurality of smaller areas into which said satellite coverage areas is divided, through which spot beams said satellite can communicate with said mobile terminals in said satellite coverage area;

identification information given to each of said spot beams is transmitted through each of said spot beams;

said mobile terminal, when registering its location, receives said spot beam identification information at a plurality of moments in time, said mobile terminal transmits, via said satellite, at a plurality of sets of information including received spot beam identification information and information on reception time of each spot beam identification information; and an overlapped area of a plurality of spot beam coverage areas at the time when each of said spot beam identification information is received at said mobile terminal, is used as the location information of said mobile terminal.

2. A system for determining and registering the location of a mobile terminal for a communication system with non-geosynchronous orbiting satellites wherein:

a plurality of non-geosynchronous satellites are disposed and a plurality of land earth stations are disposed on the earth;

each of said satellites irradiates a spot beam to its satellite coverage area on the earth where mobile terminals can communicate with the satellite, or each of said satellites irradiates a spot beam to each of a plurality of smaller areas into which said satellite coverage area is divided, through which spot beams said satellite can communicate with said mobile terminals in said satellite coverage area;

identification information given to each of said spot beams is transmitted through each of said spot beams;

said mobile terminal, when registering its location, receives a plurality of said spot beam identification information at the same time, and transmits, via said satellite, said received spot beam identification information and information on time when said mobile terminal received said spot beam identification information; and an overlapped area of a plurality of spot beam coverage areas at the time when a plurality of sets of spot beam identification information are received at said mobile terminal, is used as the location information of said mobile terminal.

* * * * *